(12) United States Patent
Panzer

(10) Patent No.: US 11,069,249 B2
(45) Date of Patent: Jul. 20, 2021

(54) METHOD AND SYSTEM FOR FALL PREVENTION IN OLDER ADULTS

(71) Applicant: Victoria Panzer, Greenbank, WA (US)

(72) Inventor: Victoria Panzer, Greenbank, WA (US)

( * ) Notice: Subject to any disclaimer, the term of this patent is extended or adjusted under 35 U.S.C. 154(b) by 121 days.

(21) Appl. No.: 16/564,190

(22) Filed: Sep. 9, 2019

(65) Prior Publication Data

US 2020/0020240 A1 Jan. 16, 2020

Related U.S. Application Data

(63) Continuation of application No. 12/621,495, filed on Nov. 18, 2009, now Pat. No. 10,438,496.

(60) Provisional application No. 61/199,595, filed on Nov. 18, 2008.

(51) Int. Cl.
G09B 19/00 (2006.01)
G09B 5/00 (2006.01)

(52) U.S. Cl.
CPC ................................... G09B 5/00 (2013.01)

(58) Field of Classification Search
CPC .............................................. G09B 19/00
USPC ................................................. 434/258, 365
See application file for complete search history.

(56) References Cited

U.S. PATENT DOCUMENTS

| | | | |
|---|---|---|---|
| 6,436,009 B1 | 8/2002 | Marucci | |
| 6,705,869 B2 | 3/2004 | Schwartz | |
| 7,282,031 B2 | 10/2007 | Hendrich | |
| 7,612,681 B2 | 11/2009 | Azzarro | |
| 7,980,856 B2 | 7/2011 | Grabiner et al. | |
| 7,988,647 B2 | 8/2011 | Bunn et al. | |
| 2005/0099719 A1 | 5/2005 | Katai et al. | |

OTHER PUBLICATIONS

Tinetti ME, Baker DI et al. A multi-factorial intervention to reduce the risk of falling among elderly people living in the community. journal, 1994, pp. 821-827, v.331 #13, New England Journal of Medicine, USA.
Tennstedt S, Howland J et al. A Randomized Controlled Trial of a group intervention to reduce fear of falling. journal, 1998, pp. B384-392, v.53B #6, Journals of Gerontology. Oxford.
SBIR.gov, Grant Information Search Result. Internet search, Accessed Jan. 24, 2013.
Panzer V. Behavioral Intervention to Prevent Falls in Older Adults. Extracts from an Unpublished Confidential Grant application, 2003, Dept. of Health and Human Services, National Institutes of Health, National Institute on Aging.
Dearborn J, Panzer V et al. Effect of gender on communication of health information to older adults. journal, 2006, pp. 637-641, v.54#4, Journal of the American Geriatrics Society, USA.

(Continued)

*Primary Examiner* — Kesha Frisby

(57) ABSTRACT

The present invention consists of a Multimedia Fall Prevention system serving the fall prevention needs of older adults. Every year approximately 1 in 3 older adults who are over 65 will fall according to the Centers for Disease Control and Prevention. The first step in preventing falls is for each person to understand those elements of their personal characteristics that make them likely to fall. Next, they must be able to recognize situations that may cause them to fall. A system is disclosed that addresses each of these issues. The system is comprised of three separate components: a personal interview, one or more training sessions, and one or more evaluations.

20 Claims, 13 Drawing Sheets

(56) References Cited

OTHER PUBLICATIONS

Young M, Panzer V et al. Influence of a multimedia fall prevention program for seniors on recognition of fall risks (abstract).. journal supplement, 2007, p. 70, v. 47 #82, The Gerontologist, Oxford.

Hakimrm, Roginski A, Walker J. Comparison of fall risk education methods for primary prevention with community-dwelling older adults in a senior center setting. journal, 2007, pp. 60-68, v.30 #2, Journal of Geriatric Physical Therapy.

Yardley L, Nyman SR. Internet provision of tailored advice on falls prevention activities for older people: a randomized controlled evaluation. journal, 2007, pp. 122-128, v.2 #2, Health Promotion International, Oxford.

LaterLife Training, Falls Learning / Teaching Tools Workshop, Nov. 2005, pp. 41.

INTERVIEW MODULE

TRAINING MODULE

TRAINING MODULE, cont'd.

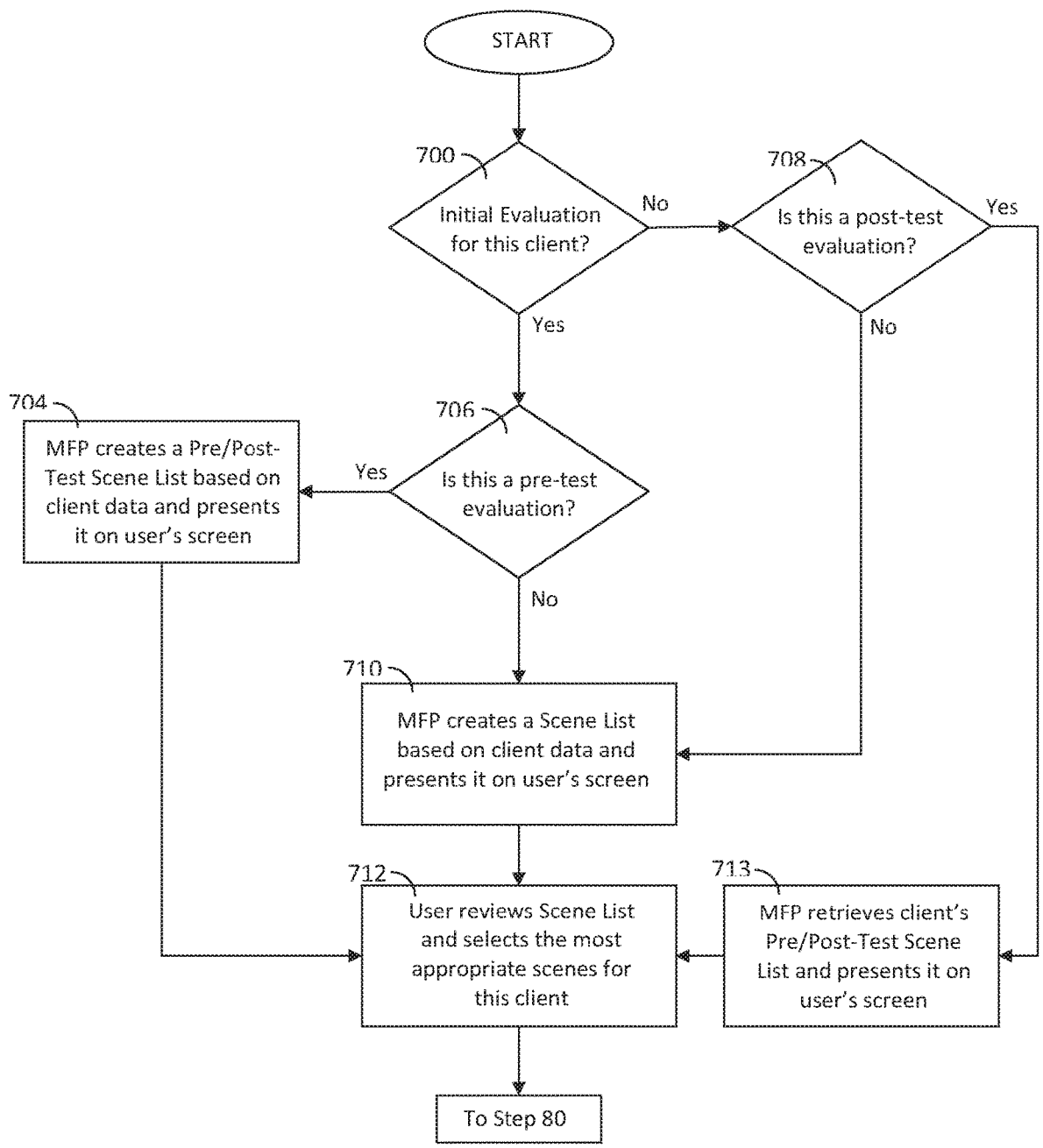

EVALUATION MODULE, cont'd.

METHOD AND SYSTEM FOR FALL PREVENTION IN OLDER ADULTS

CROSS REFERENCE TO RELATED APPLICATIONS

This application claims the benefit of U.S. application Ser. No. 12/621,495, filed Nov. 18, 2009, which claims priority to U.S. provisional application 61/199,595 filed on Nov. 18, 2008. The contents of both applications are incorporated by reference in their entirety.

RELATED APPLICATIONS

This application claims priority under 35 USC Section 119 to Provisional Application No. 61/199,595, which is hereby incorporated by reference for all purposes.

FIELD OF THE INVENTION

This invention relates generally to a new method and system for providing personalized safety awareness interventions, and particularly to a method and system for training individuals to prevent falls and assessing their recognition of personally relevant fall threats.

BACKGROUND

Preventing falls in older adults is a high-priority public health issue. A large proportion of the population is at risk; approximately 30% of those over age 65 fall every year. The Centers for Disease Control and Prevention (CDC) reports that there were 35.6 million falls by older adults in 2007, 1.8 million of which resulted in injury. Of these fallers, 32% needed help with daily activities, almost 200,000 needed help for more than six months, and 15,800 died as a result of their fall. Even a minor injury puts the faller at significantly increased risk for another fall, based on data collected by the Centers for Medicare and Medicaid Services (CMS). Falls frequently result in short- and long-term health consequences and increased health care utilization.

Although major fall prevention research programs have been underway since the 1990's, there has been little change in the incidence of falls among older adults. Only a few fall prevention approaches have had some success, primarily those involving clinical assessments of fall risk and/or exercise interventions (see Hendrich, U.S. Pat. No. 7,282,031; Lach et al, Falls in the elderly: Reliability of a classification system, *J Amer Ger Soc*, 1991, 39(2), 197-202; Tinetti et al, Fall risk index for elderly patients based on number of chronic disabilities, 1986, *Am J Med*, 80(3), 429-434; Tinetti et al, A multi-factorial intervention to reduce the risk of falling among elderly people living in the community, *N Engl J Med*, 1994, 331(13), 821-827). However, there are considerable problems associated with these methods. For example, clinical intervention is resource-intensive and many physiological problems of older adults cannot be corrected. Also, individuals have varied response to exercise prescriptions and many participants do not follow the recommended program. Although a variety of technological methods to help reduce falls have been developed (e.g., assessing a person's fall-risk, detecting whether a fall has occurred, protecting against fall-related injury), these approaches have also had limited success. Examples of such technological methods known in the field are described by Panzer et al (Biomechanical aspects of quiet standing and changes associated with aging, *Arch Phys Med Rehabil*, 1995, 76(2), 151-157) and by Azzarro et al (U.S. Pat. No. 7,612,681). Because the primary cause of a fall is usually context-specific and since fallers tend to be poor historians, it is difficult for practitioners using these approaches to identify specific functions, actions, or environmental characteristics that may lead to a fall.

In addition, numerous studies have shown that behavioral change is not easy to accomplish. Studies have found that programs that simply provide fall prevention advice are often seen as useful in principle but not personally relevant because their recommendations are regarded as 'common sense'. Such advice may also be seen as a threat to one's identity and personal autonomy. Research has shown that behavioral change programs are most successful when individuals are motivated to change and feel they retain control.

A key barrier to successful fall prevention is the resistance of older adults to change their habits or modify familiar settings. Simply stated, seniors are reluctant to make changes. A Canadian study found that 20% of the seniors in the study refused to modify their home environment as recommended, even when there were no costs involved. Of those who agreed to modify their environment, a followup visit found that only 59% of these modifications were still in place 12 months later. These findings underscore that people resent being told what to do and prefer to come to the need for change on their own. Changing one's behavior or home environment is seen differently if it stems from one's own ideas and they feel they have control of the situation.

Of the many studies on behavior change, Gibson's pioneering work in the field of Ecological Psychology is especially relevant to the prevention of falls (see Gibson, The theory of affordances, in R E Shaw & J Bransford (Eds.), 1977, *Perceiving, acting and knowing: Toward an ecological psychology*. Hillsdale N.J., Erlbaum). Gibson focused on training individuals to recognize opportunities for action in their environment and to use their abilities to take advantage of such opportunities. For example, recognizing that a doormat could cause a fall provides a person an opportunity in the future to prevent a fall by noticing a doormat, holding onto something, lifting one's feet, or simply avoiding the doormat altogether. Linking perception to action in this way can directly affect behavior by encouraging individuals to recognize 'Fall Threats' (situations that are more personally relevant to them than the more commonly known 'Fall Risks') and take appropriate action. Successful interventions train individuals to quickly identify Fall Threats in various real-world situations and devise their own unique fall prevention solutions on the fly.

Because falls are caused by a variety of underlying issues, what is needed is a multifactorial approach that focuses on a host of behavioral, psychological, physiological, and environmental factors for the purpose of increasing an individual's awareness of Fall Threats and changing certain behaviors to reduce their risk of falling. The present Multimedia Fall Prevention (MFP) method and system uses such an approach, incorporating 21st century advances in digital and multimedia technologies to create a personalized fall prevention program for each participant which addresses their unique lifestyle and the characteristics of their environment.

The three major components of the present invention incorporate these principles. First, the MFP interviews that a trainer (user) conducts with his/her clients focus on issues that are very relevant to each client, translating an individual's fall history, physical, social and environmental characteristics into Fall Threats that are personally meaningful and help the client establish his/her own goals. Next, the interactive MFP training sessions allow the user to focus the client's attention on Fall Threats that take into account their particular lifestyle and any physical limitations they may have. Finally, the MFP evaluation sessions determine which Fall Threats a client is able to detect before, during, and after MFP training, thereby measuring the extent to which the individual's awareness of Fall Threats has changed. The evaluation findings also create an opportunity for the user to recommend enhanced clinical treatments and/or fine-tune cognitive or behavioral interventions to help the client in other ways.

A unique advantage of multimedia technology is that it presents multiple representations of a concept to address individual styles of learning. Visually experiencing what was once abstract leads to a positive sense of mastery. Multimedia technology takes advantage of the fact that our visual systems process 40% of sensory input, with our auditory channels also playing a major role. Because clients use many of their sensory-motor skills, they are much more likely to be actively involved during the training and learn from the experience. Multimedia technology also enables the user to assess a client's ability to process sensory information, which may lead to improved treatment and/or changes in the individual's environment.

Furthermore, multimedia technology helps fallers recognize Fall Threats in realistic and familiar situations that exist in their daily life. Individuals learn how to make their own decisions about appropriate fall prevention behaviors, which promotes a sense of optimism and self-mastery. Using real-life multimedia scenes for evaluation allows the user to identify Fall Threats that the client does not recognize and provides treatment outcome measures when used as a pre/post-test. Enabling patients to recognize real-life challenges can help them reduce their fear of falling and promote self-mastery.

Awareness of personal safety is a hallmark of successful fall prevention, however, many people who have lost some functional mobility do not see how it could affect their personal safety. Recent studies of 195 subacute rehabilitation inpatients demonstrated that a majority of them were overconfident with respect to performing certain everyday functions. The evaluation component of the MFP system permits examining whether there is a mismatch between perceived and actual abilities, which is helpful in determining a patient's readiness for discharge from a rehabilitation setting.

To test whether the present invention (MFP training using interactive multimedia vignettes) is more effective than traditional training (without vignettes), a randomized double-blind trial with 292 participants was conducted by the inventor. The subjects were randomly assigned to one of two fall prevention trainings (with or without the vignettes) and the participants in each group were tested after the training to assess their recognition of Fall Threats in 10 novel scenes. A univariate, sequential analysis of variance was performed on the number of Fall Threats recognized as a function of gender, age, treatment (with or without multimedia vignettes), and practice time (whether they attended one or two training sessions). The study found that the participants who received MFP training with multimedia vignettes recognized significantly more Fall Threats one month later than those in the non-vignette training ($p=0.001$). Customizing the vignettes to include five features that were personally relevant to each participant resulted in an even greater awareness of potential Fall Threats ($p<0.001$), as did the addition of a practice session ($p=0.026$). Interestingly, the participants' gender and age were not found to have independent effects on outcome.

In a longitudinal followup study, 212 of these participants ranging in age from 60-96 years old kept daily logs and were telephoned weekly by independent research associates blinded as to study group. Measures were taken of the amount of time that had elapsed until a subject recorded new fall prevention measures and the time until his/her second fall. The subjects were followed for up to 56 weeks and the standard Medicare criterion was used to determine if the subject had a second fall during this period. Cox survival models were used to evaluate the main effect and interactive effect on outcome of the subjects' gender, age, and extent of impairment. The study found that women reported new fall prevention measures sooner than men, especially those whose training had included multimedia vignettes. Among those who participated at least 12 weeks (n=171), both men and women who had received multimedia training (n=111) were significantly less likely to experience two falls during the followup period than those who had not ($p=0.016$). The addition of multimedia resulted in significantly fewer falls in as little as 12 weeks, and this outcome was observed in both sexes.

To understand whether the cognitive and behavioral changes that result from viewing the MFP vignettes actually influence the likelihood of a fall, the inventor used structural equation modeling to evaluate the deterministic relationships between the subject variables (gender, age, and extent of impairment) and progressively more distal outcome measures (number of fall threats recognized, number of new prevention behaviors recorded, time to second fall, and average number of falls per week). The study found that awareness of one's unique Fall Threats and the execution of new fall prevention behaviors were both significant factors in preventing falls. When Fall Threat recognition (cognitive) and personal action (behavioral) components were removed, the power of the intervention was significantly diluted and the remaining fall prevention effects were attributed primarily to the extent of the subject's physical impairment.

The research findings summarized above show that the present invention, when used with older adults, is effective in increasing an individual's awareness of Fall Threats and changing key behaviors to reduce their risk of falling. The relatively low cost of MFP components permit this new fall prevention program to be delivered in practically any setting, including community senior centers and other non-medical settings. The MFP method and system has the potential to significantly reduce the number of falls experienced by millions of older adults each year, thereby increasing their life expectancy and quality of life.

BRIEF DESCRIPTION OF THE DRAWINGS

The accompanying drawings, which are incorporated in and constitute a part of the specification, illustrate presently preferred embodiments of the invention and, together with the general description given above and the detailed description of the embodiments given below, serve to explain the principles of the invention. As shown throughout the drawings, like reference numerals designate like or corresponding parts.

FIG. 6b is a continuation of the flowchart of FIG. 6a.

FIG. 7a is a flowchart illustrating various actions that can be performed during different types of MFP evaluation sessions. FIG. 7b is a continuation of the flowchart of FIG. 7a.

DETAILED DESCRIPTION OF THE INVENTION

The present invention consists of a multifaceted system for providing interactive fall prevention training to older adults who are at risk for falls. The first step in preventing falls is for older adults who are at risk is to understand elements of their personal characteristics that make them likely to fall. Next, they should be able to recognize, in an instant, particular situations in everyday life and their own personal characteristics that may cause them to fall. Finally, they should be able to devise their own unique fall prevention strategy 'on the fly' when confronted with one of these situations. The Multimedia Fall Prevention (MFP) system addresses each of these issues in a manner that is not only palatable to older adults but is also 'empowering'. Such a system "teaches a man to fish, rather than giving him a fish."

Figure 1:
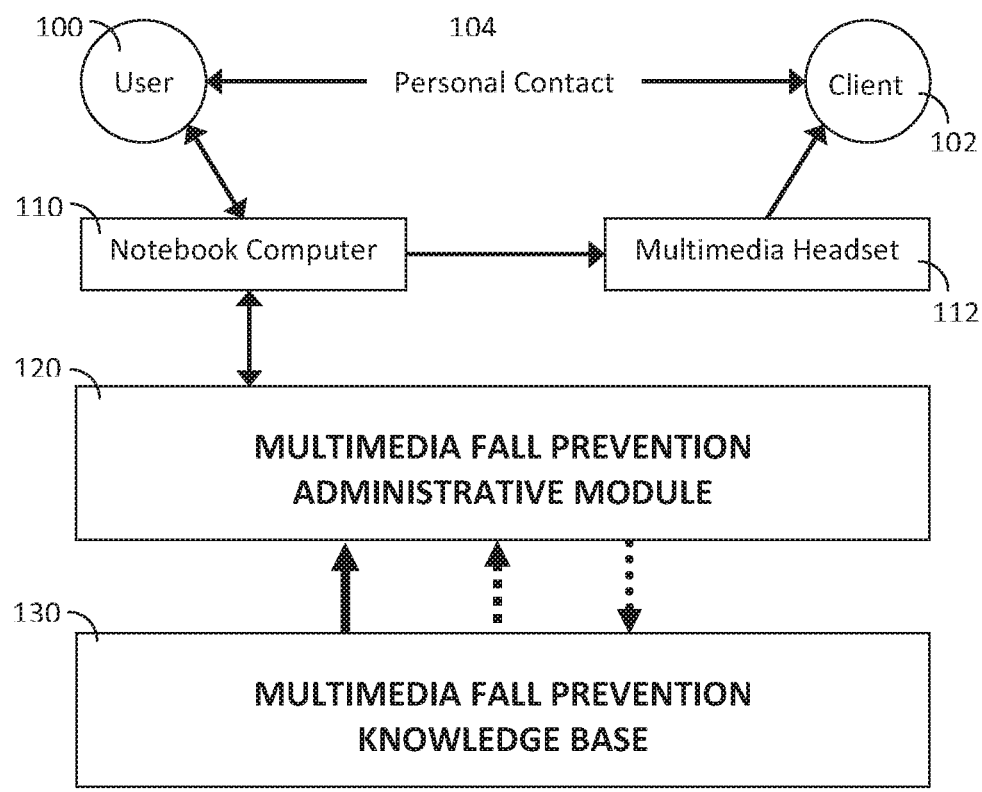
FIG. 1 is a schematic diagram showing the interactive activity between the six principal components of the Multimedia Fall Prevention (MFP) system according to one embodiment of the invention.

FIG. 1 is a schematic diagram showing the six principal components of an MFP system in one embodiment of the invention. It shows a user 100 who is using a notebook computer 110 to access two major MFP software applications: an MFP Administrative Module 120 and an MFP Knowledge Base 130. FIG. 1 also shows a client 102 who is the recipient of the MFP training. The client is wearing a multimedia headset 112 to receive a variety of audio and video stimuli such as short clips (vignettes and scenes) that illustrate potential fall threats. In this embodiment, user 100 and client 102 are in the same room and communicating with each other through personal contact 104. This is by no means the only embodiment of the system.

The MFP system is designed to be compatible with a variety of computer systems, multimedia headsets, fall prevention approaches, and training environments. User 100 may be a clinician (such as a physician, nurse, therapist or social worker) or a senior center counselor or community volunteer who offers services to older adult clients. Client 102 is an individual who is likely to be at risk for falls. The notebook computer 110 shown in this embodiment may be one of several types of commercially available portable computers that can allow the MFP system to be used in a variety of settings. An MFP Administrative Module 120 and an MFP Knowledge Base 130 are shown with a series of arrows and a barrier between them. Separating the Administrative Module 120 and the Knowledge Base 130 offers many advantages that will be described in later sections. Administrative Module 120 is a database that includes information about user's 100 training environment and setting as well as data concerning the client 102. Depending on the setting, Administrative Module 120 may contain personal medical information protected by HIPAA regulations. The multimedia headset 112 may be one of several types of commercially available headsets that provide video and audio capabilities. Multimedia headsets 112 that include headphones and some degree of blockage of the visual field are preferred because they minimize outside distractions.

Figure 2:
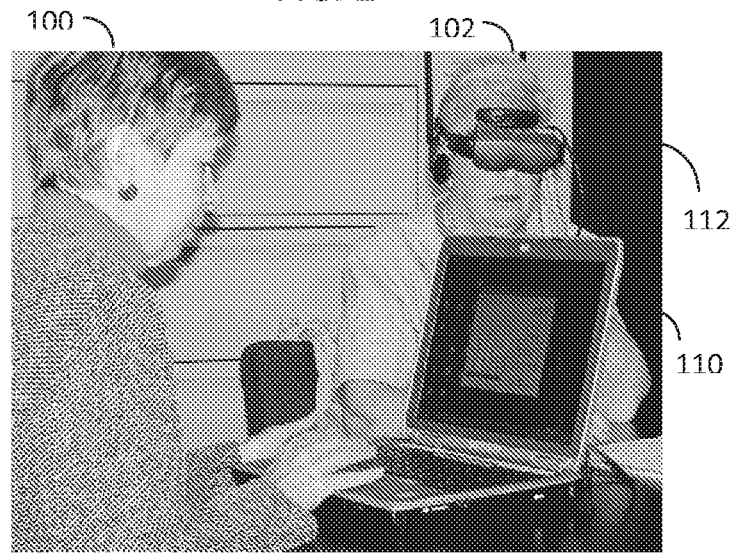
FIG. 2 is a photograph showing a research associate (user) testing the performance of the MFP system with a research volunteer (client); it illustrates four of the six principal components of the MFP system according to the embodiment shown in FIG. 1. A photograph was included to show what a typical multimedia headset looks like and the general proximity of the participants to each other in one embodiment of the invention.

FIG. 2 is a photograph showing a research associate (user 100) testing the performance of the MFP system with a research volunteer (client 102); it illustrates four of the six principal components of the MFP system according to the embodiment shown in FIG. 1: a user 100 using a notebook computer 110, and a client 102 wearing a multimedia headset 112. A photograph was included to show what a typical multimedia headset looks like and the general proximity of the participants to each other in one embodiment of the invention.

Figure 3:
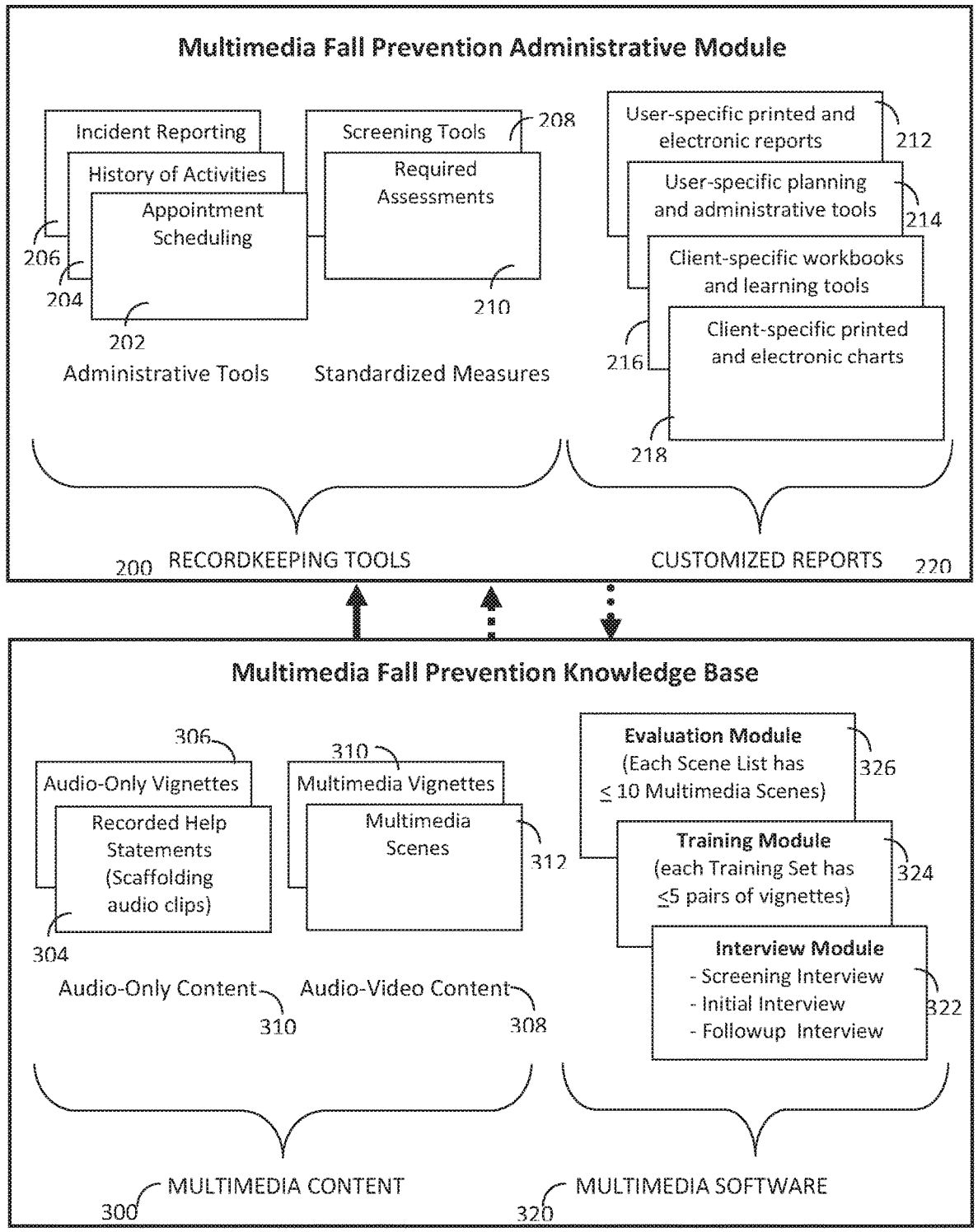
FIG. 3 is a schematic diagram showing the primary components of the MFP administrative module and the MFP knowledge base.

FIG. 3 is a schematic diagram showing the primary components of an MFP Administrative Module 120 and MFP Knowledge Base 130. Administrative Module 120 has two major parts, recordkeeping tools 200 and customized reports 220. Recordkeeping tools generally include administrative tools that facilitate the scheduling of appointments 202 for each client 102, a history of client activities 204 relevant to MFP training, and any reported incidents (particularly falling incidents) 206 for each client 102. The reporting of falls and other incidents 206 is a common requirement in many settings involving older adults and note keeping by the user 100 is also valuable in order to stay abreast of falls and other medical, personal and social issues encountered by the client 102. The information in Administrative Module 120 is made available to the Knowledge Base 130 and used to create many personalized components of an MFP system. Standardized screening measures 208, such as those for fall-risk, depression, and balance confidence are valuable tools and may be mandatory in many settings (e.g. assisted living, long term care facilities). Administrative Module 120 offers forms and procedural information needed for facility staff to conduct required assessments 210 of clients 102.

The Administrative Module 120 is capable of producing a variety of customized reports 220, including printed and electronic reports 212 for facility staff to use in required reporting, eliminating the need for repetitive handwritten records. Planning and administrative tools 214 streamline the workload of the user 100 and avoid duplication of effort. Client-specific workbooks and learning tools 216 are created for each client 102 to assist in MFP training. The Administrative Module 120 is also capable of producing printed and electronic charts and other client-specific material 218 that the client 102 can bring to their doctor, family member, or other relevant party. The customized reports 220 produced by the Administrative Module 120 are designed to be valuable, not only for the user 100, but also for the client 102.

The information in the Administrative Module 120 is available to a Knowledge Base 130 which has two major parts, multimedia content 300 and multimedia software modules 320. These components are designed to help personalize the MFP training experience to meet the unique needs of a client 102. Multimedia content 300 includes audio-only content 310 and audio-video content 308. Multimedia software modules 320 include an Interview Module 322, Training Module 324, and Evaluation Module 326.

Two types of audio-only content 310 are included in the Knowledge Base 130: recorded help statements 304 (called 'Scaffolding Help') and audio-only vignettes 306. Recorded help statements 304 are 5-10 second audio clips that offer the brief thoughts of other seniors about a specific situation to help the client 102 understand Fall Threats and answer the questions posed during an MFP training session (described later). Audio-only vignettes 306 are brief audio-only stories (under one minute) containing various elements that may cause a fall. They allow visually-impaired individuals or those without access to video players to participate in MFP.

Two types of audio-video content 308 are included in the Knowledge Base 130: multimedia vignettes 310 and multimedia scenes 312. Multimedia vignettes 310 are brief audio-video stories (under one minute) containing various elements that may cause a fall. Elements which we have termed "Fall Threats" are inherent in the situation described in the vignette 310, but the vignettes 310 also contain social, behavioral, medical and even psychological issues providing a real-life or 'situated' experience. For example, it is not just that it's dark in the bedroom at night and there are obstacles that may cause a fall, but the person may want to hurry to the bathroom because of the urgency caused by the diuretic medication they are taking for their hypertension! These exemplify the personal constellation of variables that are integrated into each person's fall prevention program. The person's physician is unlikely to change the prescription, but there are many ways to prevent a fall in this situation. The goal of the multimedia vignettes 310 is to offer the client 102 experiences that permit them to discover their own unique concerns and stimulate them to formulate fall prevention strategies that meet their individual needs. Multimedia Scenes 312 are very brief (10-15 second) audio-video clips that show Fall Threats of various types. Scenes 312 do not include a story, only the sights and sounds of a specific situation that is part of everyday life for most seniors in various settings. In reality, it is rare that a person has even 10 seconds to recognize a Fall Threat and prevent a fall. When an individual is able to recognize a Fall Threat in both familiar and novel settings, they come to the understanding that they have the power to prevent a fall. Often an individual does not realize things that they really do know about themselves.

Three types of multimedia software modules 320 are included in the Knowledge Base 130: an Interview Module 322, Training Module 324, and Evaluation Module 326. The Interview Module 322 is one of the primary means used to personalize an MFP training program. Information that is provided during the interview is used to identify specific parameters that create a profile of each individual. There are three types of interviews: a Screening Interview 504, Initial Interview 508, and Followup Interview 510. The Administrative Module 120 component of the MFP system and the user 100 determine which type of interview should be conducted at a particular stage of an MFP training program. The Multimedia Training module 324 utilizes multimedia vignettes 310 and recorded help statements 304, to create Training Sets composed of up to five pairs of vignettes 310 using a method that will be described later. The Evaluation Module 326 utilizes multimedia scenes 312 to create Scene Lists composed of up to ten scenes 312 using a method that will also be described later.

Keeping the Administrative Module 120 and Knowledge Base 130 separate permits the customization and individualization of an MFP system to meet the distinct needs of different users 100 and clients 102. Each component can be modified without sacrificing the integrity of the other. The solid arrow shown in FIG. 1 and FIG. 3 indicates that Knowledge Base 130 can write information to Administrative Module 120 and the heavy dashed arrow indicates that Knowledge Base 130 has limited read permission to access information stored in Administrative Module 120. In the opposite direction, the lighter dashed arrow indicates that the Administrative Module 120 has limited read permission to access information stored in Knowledge Base 130. Another advantage of keeping the Administrative Module 120 and Knowledge Base 130 separate is that multimedia audio and visual content, including vignettes 306 and 310, scenes 312, and recorded help statements 304 may be continually updated with no risk to Administrative Module 120. This allows for an ever-growing library of fall prevention material relevant to seniors of all varieties in diverse settings. Although the Administrative Module 120 and Knowledge Base 130 are separate components of the MFP system, they share information and work closely together; the terms "MFP system" and "MFP" generally include components of both the Administrative Module 120 and Knowledge Base 130. A more detailed description of the methodology for using of the various components within the Administrative Module 120 and Knowledge Base 130 will be presented in a later section.

We have tested in our research the embodiment of the MFP system and have found that it provides the desired immersive experience for a wide variety of clients 102, including independent community dwellers, individuals with Parkinson's disease, those needing assistance with activities of daily living, persons with dementia (one participant was 97 years old)! We also found that the MFP system is effective in increasing an individual's awareness of Fall Threats, which has led to their changing behaviors in ways that reduce their risk of falling. Various alternate embodiments exist, but the use of a notebook computer and a multimedia headset permits the system to be deployed in a multitude of ways. The relatively low cost of MFP components permit this new fall prevention program to be delivered in practically any setting, including community senior centers and other non-medical settings.

Figure 4:
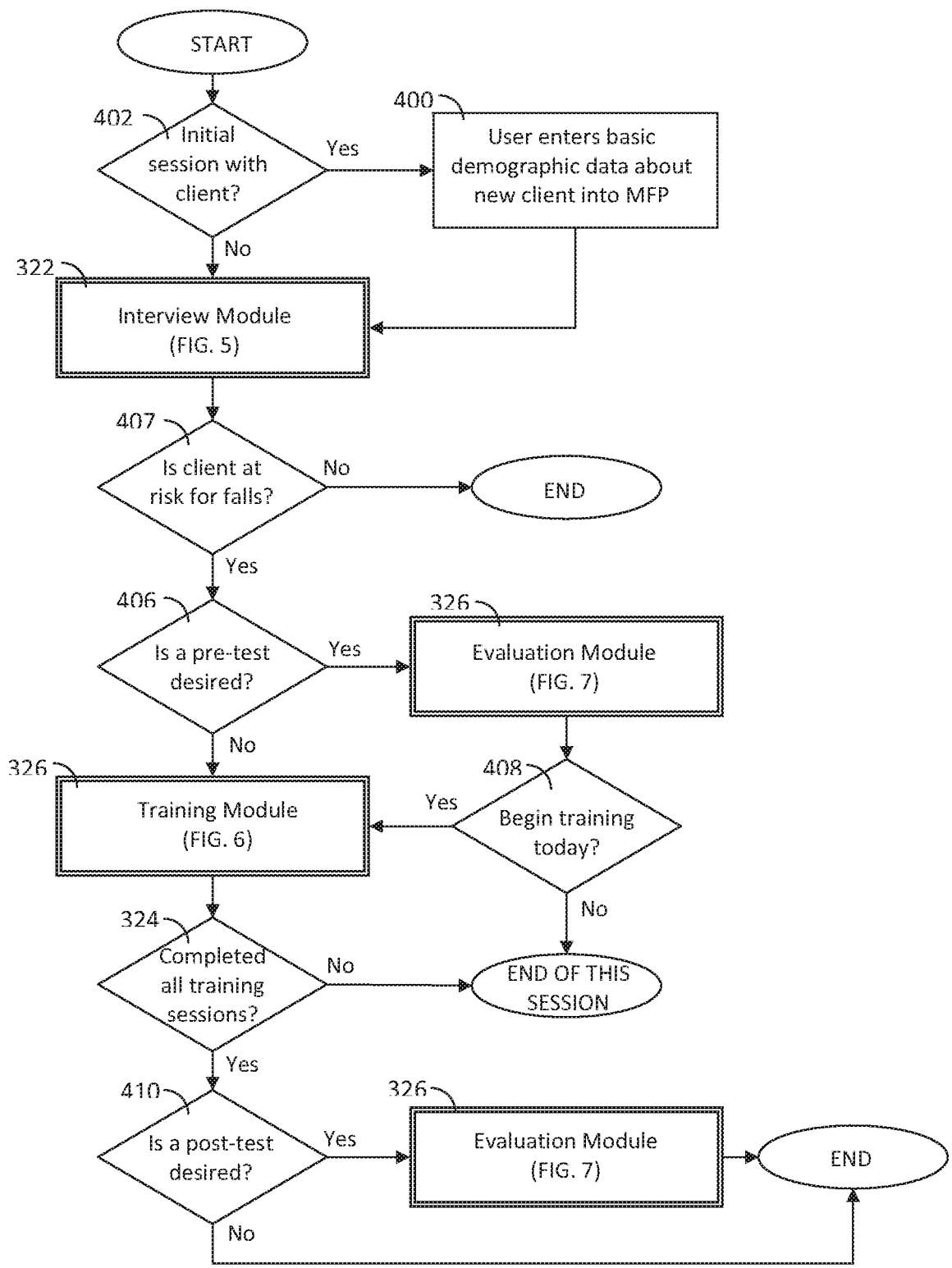
FIG. 4 is a flowchart providing an overview of the major actions performed during the course of an MFP training program.
Figure 5:
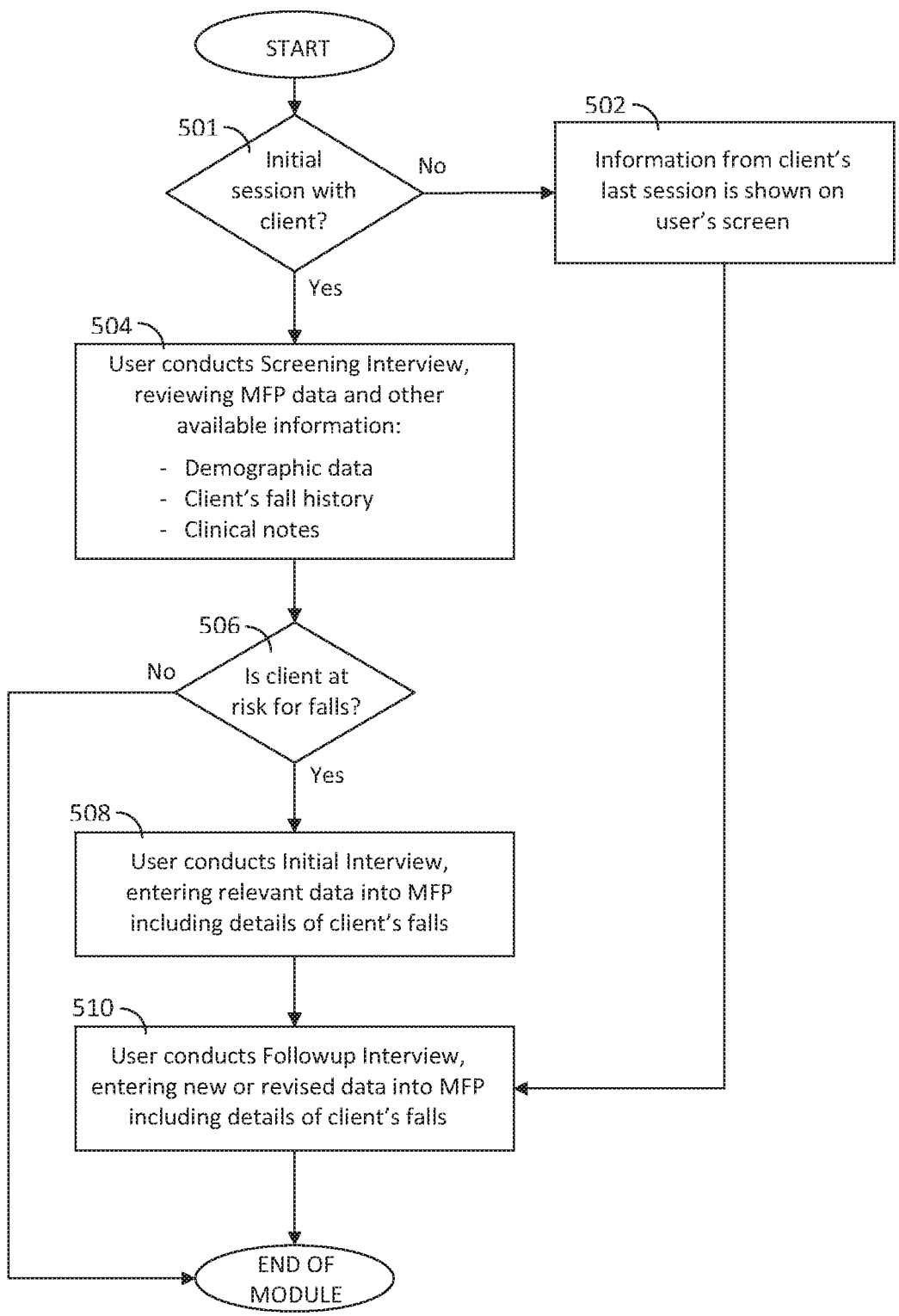
FIG. 5 is a flowchart illustrating various actions that can be performed during different types of MFP interview sessions.
Figure 7B:
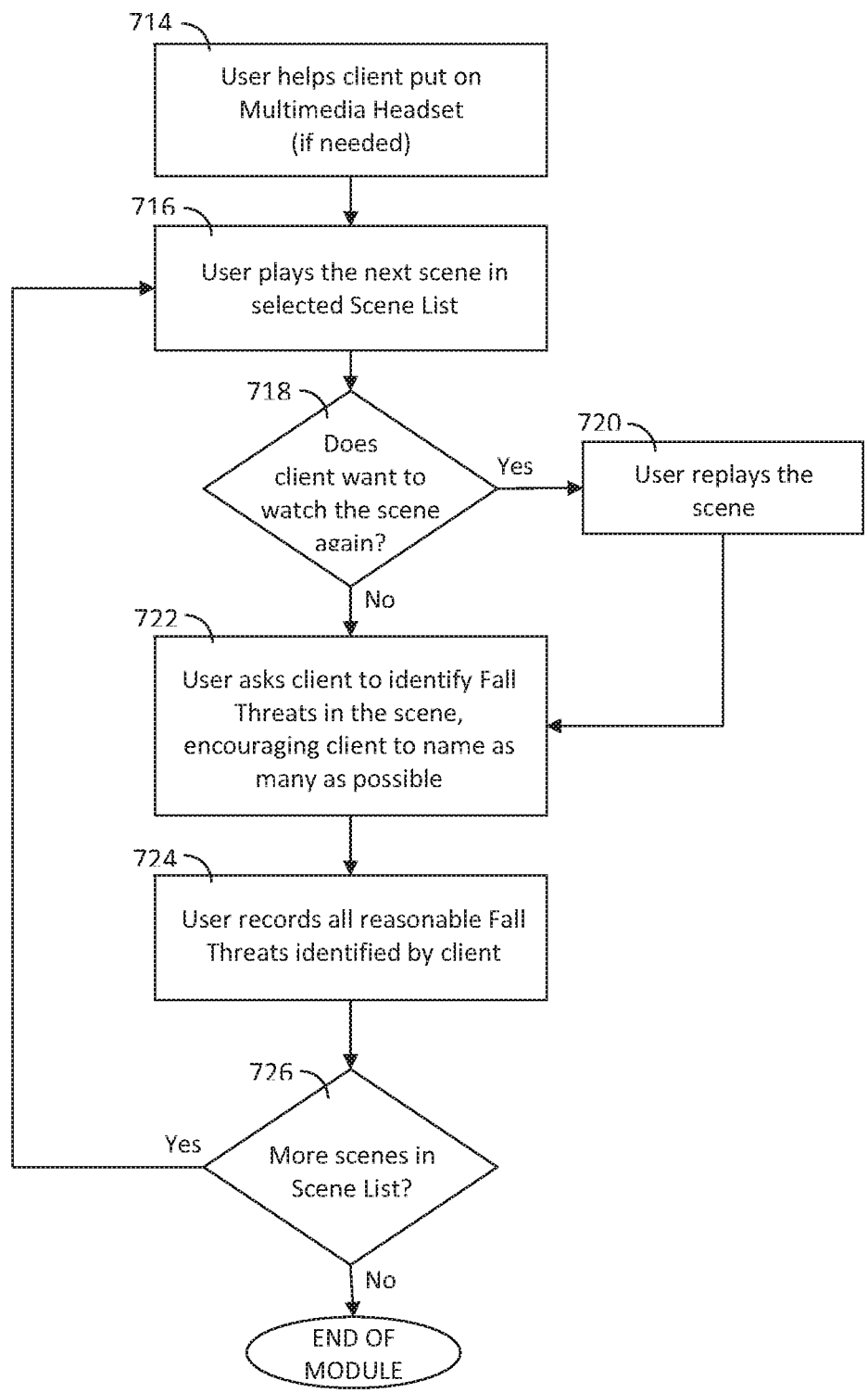

FIG. 4 is a flowchart providing an overview of the major actions performed during the course of an MFP training program. Prior to an initial session 402 with a new client 102, the user 10 enters basic demographic data 400 about the client 102 into the MFP system. At the start of each session, MFP tests to see if this is the first session 402 with this client 102. Depending on the whether or not the client 102 had a previous interview and the status of that interview, the user 100 is directed by the Interview Module 322 to conduct the most appropriate type of interview. The various actions that can be performed during different types of MFP interview sessions are shown in FIG. 5. If this is the first session with this client 102, the user 100 conducts a Screening Interview 504 using accepted Medicare standards to determine if the client 102 is at risk for falls 407. If the client 102 is not at risk, no fall prevention efforts are necessary at this time and the session ends. If the client 102 is at risk for falls 407, the MFP system asks the user 100 if a pre-test of the client's fall-threat awareness is desired 406. If so, the user is directed to the Evaluation Module 326 to assess the client's baseline level of awareness of Fall Threats before the training program begins. The various actions that can be performed during different types of MFP evaluation sessions are shown in FIGS. 7a and 7b. The MFP system then asks the user 100 if training is requested for this session 408. If so, the user is directed to the Training Module 324 and the session continues. If not, the session ends.

Figure 6A:
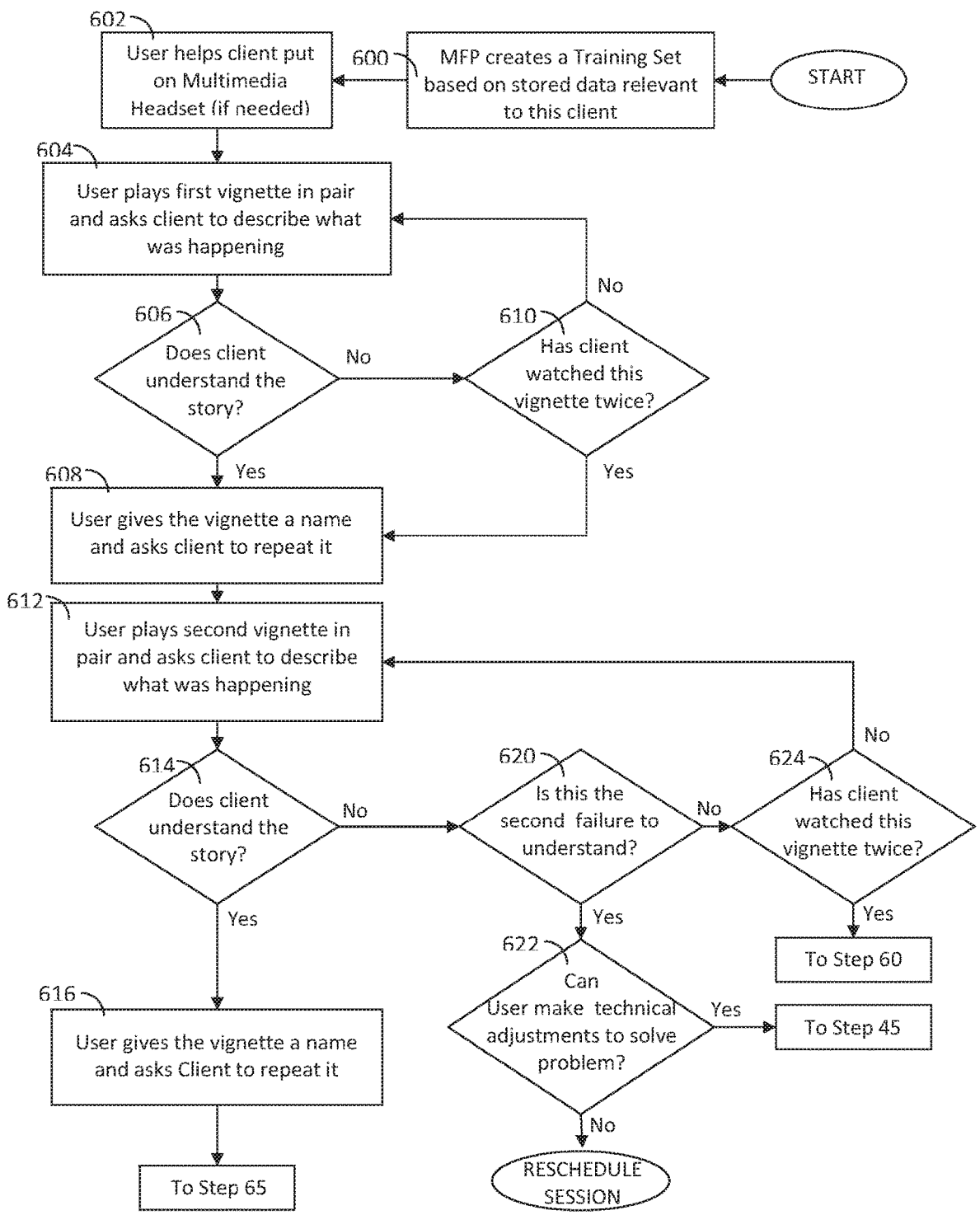
FIG. 6a is a flowchart illustrating various actions that can be performed during a typical MFP training session.
Figure 6B:
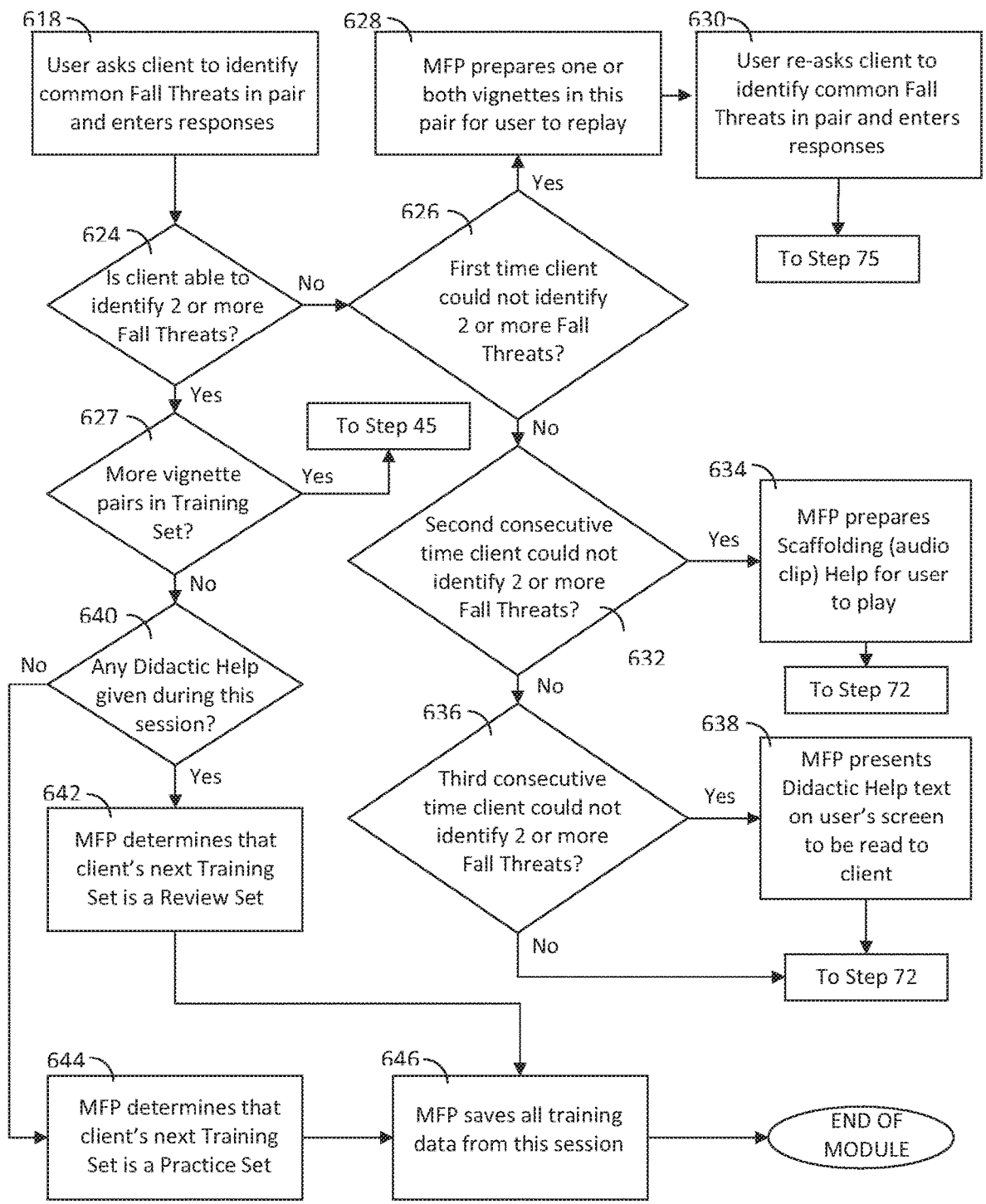

If no pre-test is desired, the user is directed to the Training Module 324. The various actions that can be performed during MFP training sessions are shown in FIGS. 6a and 6b. At the conclusion of the training session, MFP determines if the client has completed all of the training sessions 410. If so, MFP asks the user 100 if a post-test of the client's fall-threat awareness is desired 412. If so, the user is directed to the Evaluation Module 326 to assess the client's level of awareness of Fall Threats at the end of the training program. If a post-test is not requested and/or if all training sessions have been completed, the session ends.

FIG. 5 is a flowchart illustrating various actions that can be performed during different types of MFP interview sessions. The elements of an interview are specific to the setting in which it will be administered. The following exemplary interview demonstrates elements useful in many settings. At the start of each session, MFP tests to see if this is the first session 501 with this client 102. Depending on the whether or not the client 102 had a previous interview and the status of that interview, the user 100 is directed by the Interview Module 322 to conduct the most appropriate type of interview. If this is not the first session, information entered in the client's 102 last interview is shown 502 on the user's 100 screen. If it is the first session, a Screening Interview is conducted 504 to evaluate if the client 102 is at risk for falls according to CMS and published clinical criteria. Screening criteria are primarily based on fall history, beginning with the number of prior falls or near-falls (also called loss of balance). Other demographic and clinical criteria are presented for the user's consideration, these are well known to individuals skilled in the art and the decision 506 to continue using the MFP system with this client 102 is made by the user 100.

If the client is at risk for falls, the Initial Interview 508 is conducted and the user 100 gathers information that varies with the specific setting. For example, a user 100 at an assisted living facility would not need to ask about the type of bathing facilities the client 102 uses as this would already be known. The Interview Module 322 offers an easy-to-use approach for recording fall history and the details of falls that the client 102 can recall. A client's 102 fall history data, including detailed information about previous falls, is used to personalize future MFP training sessions.

Not every client 102 who is considered to be at risk for falls will have actually had a fall. A wide variety of elements are presented in the Initial Interview 508 and the user 100 has flexibility to decide which areas to focus on during the discussion. In most cases, the user 100 will ask about the client's 102 awareness of situations that could cause a fall, which could form the basis for training sessions to help the client 102 generalize to similar Fall Threats. Alternatively, it may eliminate the need for training on these issues.

Information on activities of daily living (ADLs), instrumental activities of daily living (IADLs), and lifestyle is also reviewed during the Initial Interview 508 and may form critical components leading to MFP personalization. For example, a senior who uses a walker has different everyday experiences than someone who does not. The environment and residence where a client 102 spends their time may also prove fundamentally important to fall prevention. Someone who lives in Miami probably does not need to worry about ice, but rainy surfaces caused by thunderstorms can be just as slippery. If one or more interviews have previously been conducted with the client 102, the information already collected is presented on the user's screen 502, it is reviewed by the user 100 who then enters any new or revised data into the MFP system 510.

FIG. 6a is a flowchart illustrating various actions that can be performed during a typical MFP training session and FIG. 6b is a continuation of the flowchart presented in FIG. 6a. MFP Training is called Intervention or Treatment is some settings. The MFP Training module 324 obtains parameters from the Administrative Module 120 about the client's 102 previous training 324 and evaluation 326 sessions (if any) and the results of any required assessments 210. Information from the client's previous interviews 322 is also obtained. Based on the type of training that is appropriate to the specific setting and the information that is available, MFP creates a Training Set 600 for the client 102.

A Training Set consisting of five pairs of Multimedia Vignettes 310 is created 600 based on at least five elements from completed interviews 322. If limited information is available about the client 102, the Knowledge Base 130 provides a Standardized Training Set. Standardized pairs are configured based on the types of Fall Threats shown in the vignettes 310. These Fall Threats are graded for difficulty and obviousness in both audio and video context. The appropriate recorded help statements 304 are also identified by Knowledge Base 130 to complete the multimedia components of the Training Set. Other Training Sets can be based on a client's 102 fall history or their current functional state if sufficient information is available to provide this customization or individualization. These are just a few exemplary approaches to developing a Training Set and should not be taken to limit the available methods.

The user 100 then helps the client 102 put on the multimedia headset 112 in step 602, adjusting it for comfort and providing instructions on what to expect. All instructions for completing the session are presented to the user 100 on the computer 110. The client 102 will be seeing and hearing the Multimedia Vignettes 310 and recorded help statements 304 through the headset 112. In step 604, the user 100 plays the first vignette in the pair on the headset 112 and asks the client 102 to describe what was happening in the vignette. The user 100 decides in step 606 if the client 102 understood the story. If the user 100 determines that the vignette story was understood, the user 100 tells the client 102 the name of that particular vignette as a cognitive support and asks them to repeat it in step 608. In step 606, if the user decides that the story was not understood and the vignette has only been played once for the client, the user 100 plays the vignette again. If the vignette has been played twice already 610, the user 100 continues to step 608, tells the client 102 the name of the vignette as a cognitive support, and asks them to repeat it.

The training will then progress to step 612 where the user 100 plays the second vignette in the pair and asks the client 102 to describe what was happening in the vignette. In 614, the user 100 decides if the client understood the second story. If the user 100 decides the vignette story was understood, the user 100 tells client 102 the name of that particular vignette and asks them to repeat it in step 616. The vignette pair has now been presented and training will progress to step 618, shown in FIG. 6b.

In step 614, if the user 100 decides that the story was not understood by the client 102, the user 100 determines in step 620 if this is the second failure to understand (i.e., the client 102 also failed to understand the first vignette of this pair). If so, the user 100 examines and adjusts the multimedia components in step 622 to determine if the audio or video presentation was not satisfactory or if some characteristic of the client 102 (such as fatigue or illness) is causing a problem and the session should be rescheduled. If satisfactory adjustments can be made in step 622, the training will return to step 604 to repeat the entire vignette pair presentation. In step 620 If it is not the second failure to understand and the second vignette has only been played once for the client 102, the user 100 plays the vignette again. If the vignette has been played twice already in step 624, the user 100 proceeds to step 616.

The training session continues with step 618 in FIG. 6b. The user 100 asks the client 102 about the Fall Threats that are common to the two Multimedia Vignettes 310 shown. Each vignette pair has specific required Fall Threats that are configured by the Knowledge Base 130 in order to achieve maximum benefit from the training, which are listed on the user's 100 screen. The current illustrative method requires the user 100 to probe the client 102 until the client 102 reports that they do not detect any (or any further) common Fall Threats in the vignettes. The user enters those Fall Threats that are correctly identified. In step 624 the MFP determines if the client 102 was able to identify two or more of the common Fall Threats that were sought. If so, the presentation of this vignette pair is complete. MFP determines in step 627 if there are any additional vignette pairs in the Training Set and if there are, returns to step 604 to present the first vignette of the next pair.

Back in step 624, if two of the required responses were not given by the client 102, the Knowledge Base 130 prompts the user 100 to commence the help presentation. If this is the first time that the client could not identify two or more Fall Threats in step 626, MFP prompts the user 100 in step 628 to replay one or both of the vignettes in the pair. After replaying the vignettes, the user 100 again asks the client 102 to identify the common Fall Threats in the pair and enters the client's response in step 630. MFP then determines if there are more pairs to be shown per step 627 and returns to step 604 if there are or ends the session if there are no more pairs in the Training Set.

However, if this is the second consecutive time that the client 102 could not identify two or more Fall Threats (i.e., they could not identify two or more Fall Threats in the vignette pair immediately preceding the current pair) in step 632, then MFP prompts the user 100 to play two pre-selected audio help recordings (Scaffolding Help statements) in step 634. Following the Scaffolding statements, the user 100 again asks the client 102 to identify the common Fall Threats in the vignette pair and enters the client's response in step 630.

Lastly, if this is the third consecutive time that the client could not identify two or more Fall Threats (i.e., they could not identify two or more Fall Threats in the two vignette pairs immediately preceding the current pair) per 636, then MFP prompts the user 100 to read aloud the desired answers (Didactic Help statements) in step 638. Following the Didactic Help statements, the user 100 again asks the client 102 to identify the common Fall Threats in the pair and enters the client's response in step 630. If after receiving help in one of the previous steps, the client 102 successfully identifies two or more Fall Threats in a vignette pair, any subsequent help that is needed is provided as if it were the first error and one or both vignettes are replayed.

If MFP determines in step 627 that all the vignette pairs in this Training Set have been played, MFP will then determine in step 640 if the client received any Didactic Help during the training session. In step 642, clients 102 who receive Didactic Help are assigned a Review Set for their next training session. In a Review session, the same vignette pairs will be presented and all forms of help (Replay, Scaffolding, and Didactic) will be offered by the user 100 as prompted by MFP, until the client 102 identifies two or more Fall Threats or until all three forms of help are provided for each vignette pair.

If no Didactic Help was provided, the next Training Set will be a Practice Set as determined by MFP in step 644. In a Practice session, different and/or more challenging vignette pairs will be presented that include more difficult Fall Threats. In all cases, upon completion of the last vignette pair in the Training Set list, MFP saves all the training parameters from the session in step 646.

FIG. 7a is a flowchart illustrating various actions that can be performed during different types of MFP evaluation sessions. FIG. 7b is a continuation of the flowchart of FIG. 7a. MFP Evaluation may include administering a pre- or post-test, which may be used as baseline and outcome measures to assess the results of MFP training programs in different kinds of settings. In step 700, MFP determines if this the first evaluation for this client 102. If so, in step 702 MFP queries the user 100 to determine if a pre-test evaluation is desired for the client 102. If a pre-test is requested in step 702, both pre-test and post-test lists are generated by the Evaluation Module 326 in step 704.

If in step 700 it was determined that this is not an Initial Evaluation, in step 706 MFP queries the user 100 to determine if a post-test evaluation is desired. If so, MFP in step 713 obtains the post-test Scene List as determined earlier in step 704. If a post-test was not planned, MFP creates a Scene List in step 710 based on the type of evaluation that is appropriate to the specific setting and information available from Administrative Module 120 and interviews with the client 322. Regardless of path, the Evaluation Module 326 creates an evaluation Scene List and presents it to the user 100. In step 712, the user 100 reviews the Scene List and selects up to ten of the most appropriate scenes for the client 102.

In FIG. 7b, the user 100 helps the client 102 put on the multimedia headset 112 in step 714. The Knowledge Base 130 prepares a Scene List to be played randomly or in the order specified by the user 100. In step 716 the user 100 plays the first or next scene in the Scene List. After playing the multimedia scene 312 (a brief 10-15 second clip), the user 100 asks in step 718 the client 102 if the scene should be replayed. If so, the user 100 replays the scene in step 720. If the client 102 is satisfied, the user 100 asks the client in step 722 to identify all of the Fall Threats that they noticed in the scene, encouraging the client 102 to name as many as possible.

In step 724 the user records all the reasonable Fall Threats mentioned by the client (including those that could occur even if they are not evident), using words exactly or close to those that the client said in order to convey their exact intent for future use. MFP then determines in step 726 if there are any further scenes and returns to step 716 if there are or ends the session if there are no more pairs in the Scene List.

Because of the diversity of older adults, the means of providing fall prevention services must also be diverse as well as flexible. One important consideration is the cost of the multimedia headset 112. This is the most expensive component of the embodiment illustrated in FIG. 2, which combines the headset 112 with a notebook computer 110 and incorporates personal contact 104 between the user 100 and the client 102. This configuration offers extensive flexibility and portability, but the headset 112 and notebook computer 110 are costly elements. Furthermore, some users 100 will be uncomfortable with new technology and would prefer to use the hardware that they are familiar with. The MFP software provides for an easy-to-use means to substitute components and connect them, which is similar to the Plug and Play® approach. The modular nature of the present invention is independent of the components and permits accommodation to the specific needs of each client 102 in a broad range of fall prevention settings.

Figure 8:
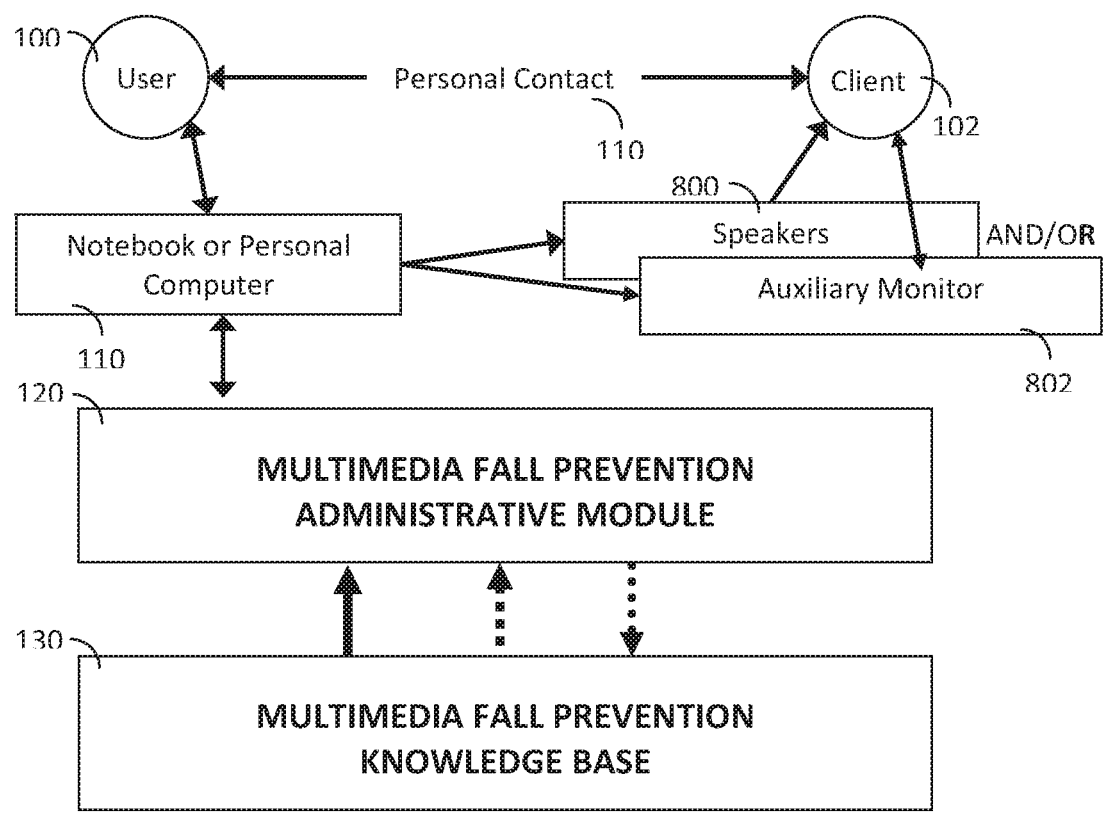
FIG. 8 is a schematic diagram of an alternate embodiment of an MFP system for use when there is no multimedia headset available.

FIG. 8 is a schematic diagram of an alternate embodiment of an MFP system for use when there is no multimedia headset 112 available or when a headset 112 is not appropriate. In a common instance, an older adult client 102 may be hard of hearing and the headset 112 and notebook computer 110 configuration may not able to be amplified enough for the user 102 to hear the multimedia content 300. Alternatively, clients 102 with digital hearing aids may experience loud whistling sounds when using headphones. The multimedia headset 112 is readily replaced with various types of speakers 800 in this embodiment. An auxiliary monitor 802 may be used when portability is not critical. A touch screen monitor may have useful applications to facilitate data entry for a user 100 or client 102 in various situations.

Figure 9:
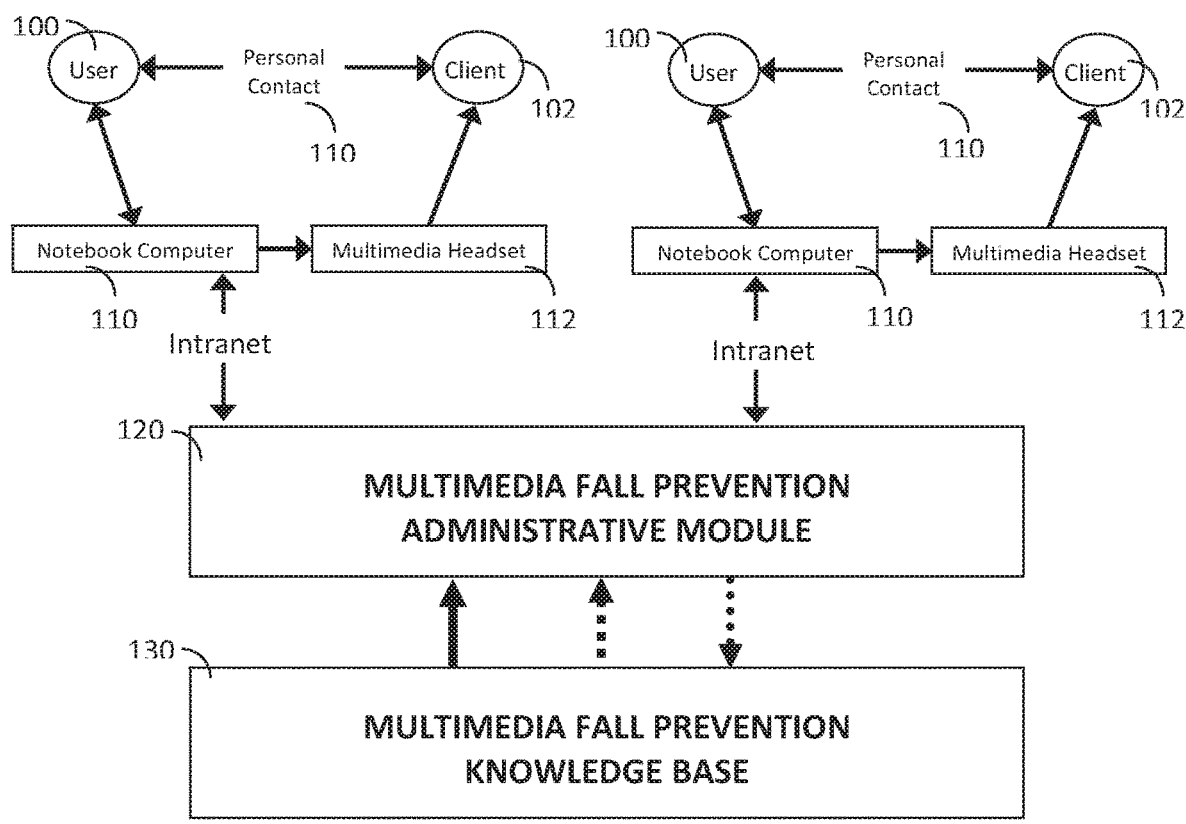
FIG. 9 is a schematic diagram of an alternate embodiment of an MFP system for use by multiple users who have access to an Intranet.

FIG. 9 is a schematic diagram of an alternate embodiment of an MFP system for use by multiple users 102 who have access to an Intranet. As medical and personal information is sensitive, it may be desirable to limit the number of notebook computers that have Administrative Module 120 client-specific data stored in their memory and/or maintain this information on a secure server. This configuration also permits multiple users 100 to work with multiple clients 102 at the same time, while insuring that the Administrative Module 120 is always up-to-date for a group of users 102.

Figure 10:
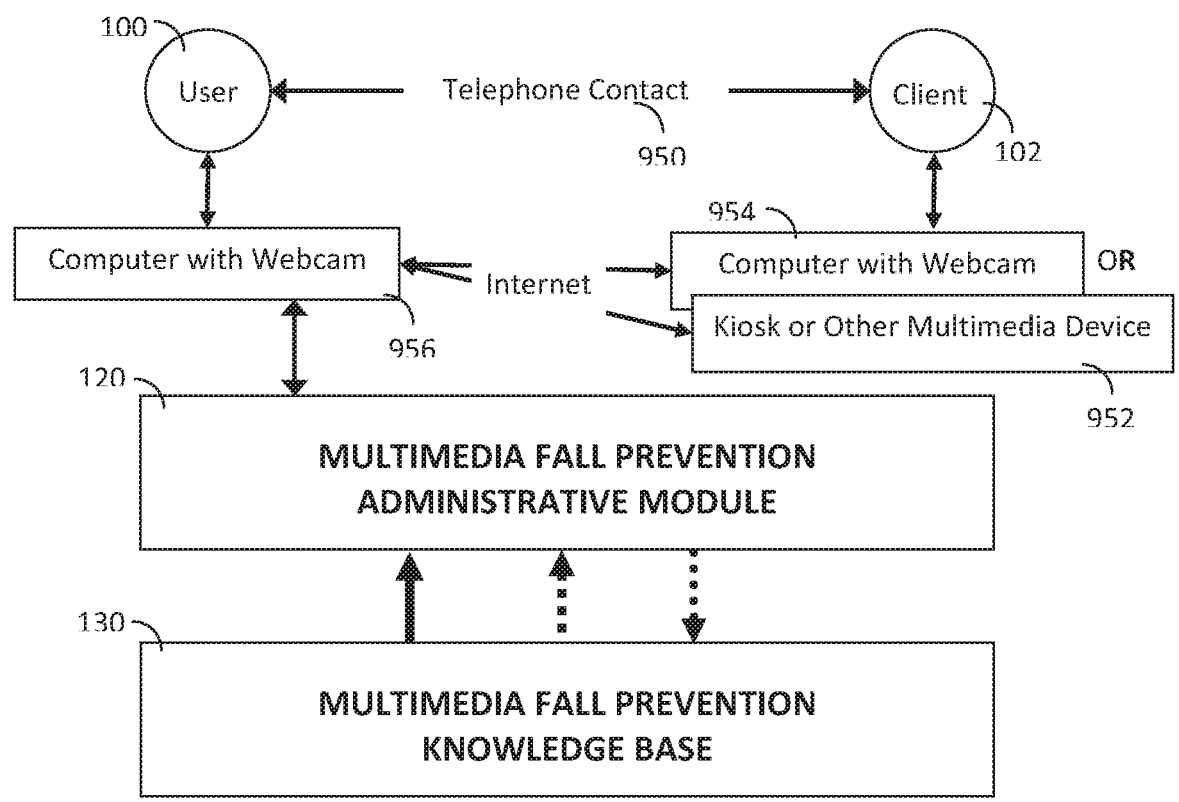
FIG. 10 is a schematic diagram of an alternate embodiment of an MFP system for use when the user and client are at remote locations.

FIG. 10 is a schematic diagram of an alternate embodiment of an MFP system for use when the user 100 and client 102 are at remote locations using some form of telephone or other communication technology 950 according to one possible embodiment of the present invention. Common elements already described are omitted from this illustrative example. Multimedia kiosks 952 are sometimes available and provide for exceptional immersive experiences. Telepresence can be achieved with inexpensive webcams 954 using the internet in this configuration. Clients 102 using a kiosk at a senior center interfaced with an expert user 100 at a remote location can have access to expert treatment without the expense and inconvenience of travel. Smart phones and other multimedia devices may provide communication and possibly provide audio or even video signals.

The explosion of digital technology has produced ready access to quite sophisticated equipment at reasonable cost, as these technologies reach the consumer market. One example is the webcam 956, whereby any Client 102 with Internet access can have visual as well as audio contact with a user 100 at a location that may be down the street or on the other side of the continent. Communication using the Voice Over Internet Protocol (VOIP) and streaming video may also be transmitted via the internet. It is impossible to envision all of the opportunities that may be facilitated with Internet communication. However, it is reasonable to state that if access to an Internet provider is available, many alternate configurations may be possible that address the unique needs of many users 100 and clients 102.

Figure 11:
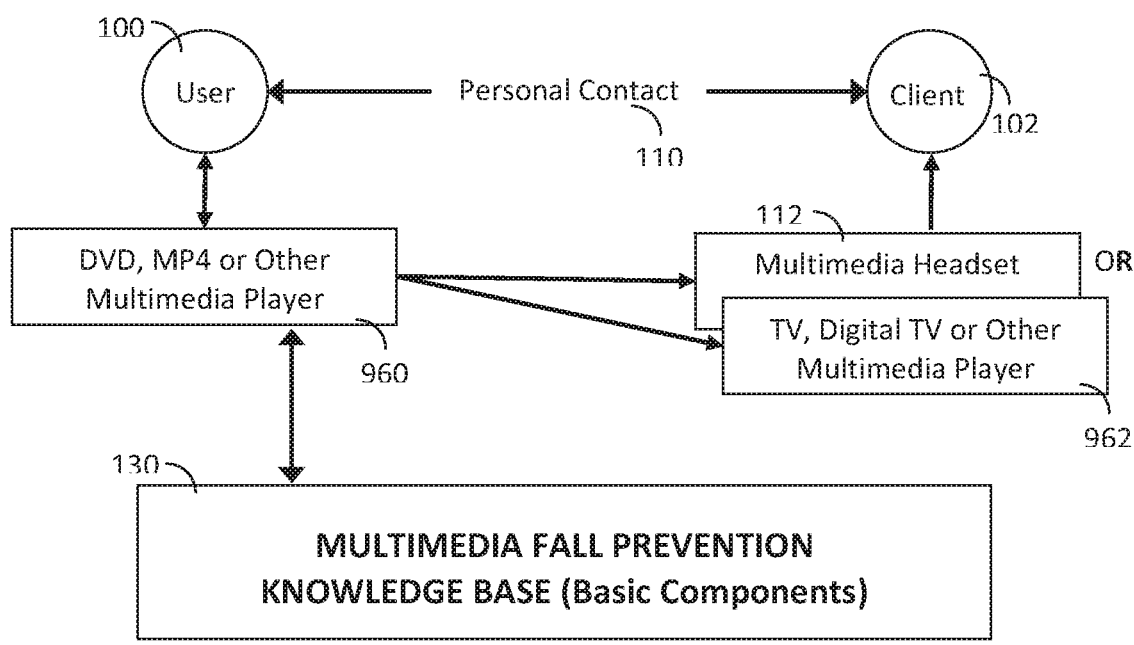
FIG. 11 is a schematic diagram of an alternate embodiment of an MFP system for use when there is no computer available.

FIG. 11 is a schematic diagram of an alternate embodiment of an MFP system for use when there is no computer available. Whereas the computer permits almost limitless access to the Knowledge Base 130 and its multimedia content 300 and software modules 320, it is quite possible to produce a DVD or other medium that contains a limited KB for use in specific settings. The MFP system can utilize a DVD, MP4 or any other player 960 and display the multimedia on a TV, Digital TV 962, lower cost consumer multimedia headset 112, or any other available player.

Figure 12:
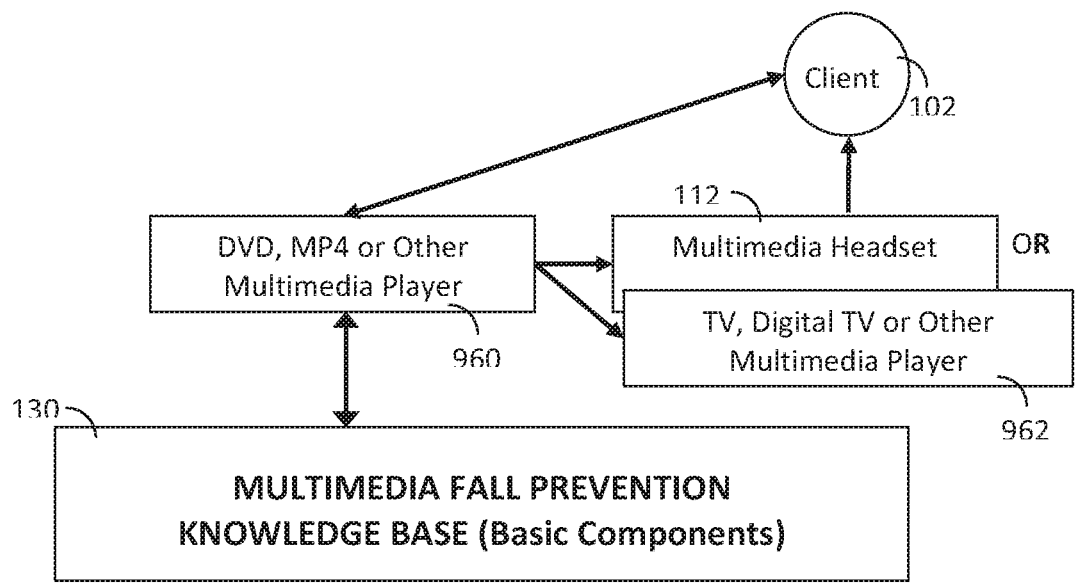
FIG. 12 is a schematic diagram of an alternate embodiment of an MFP system for use by a client alone when certain components of the system are available on DVD or another type of multimedia player.

FIG. 12 is a schematic diagram of an alternate embodiment of an MFP system for use by a client alone when certain components of the Knowledge Base 130 are available on DVD or another type of multimedia player. Many older adults are uncomfortable admitting that they have had a fall. With the broad availability of diverse digital storage medium and the continued decrease in the cost, it is quite reasonable to provide a limited knowledge base 970 configured for use directly by a client 102. This configuration could be experienced using a DVD, MP4 or any other player 960 and the multimedia displayed on a TV, Digital TV 962, lower cost consumer multimedia headset 112 or any other available player as previously described.

Figure 13:
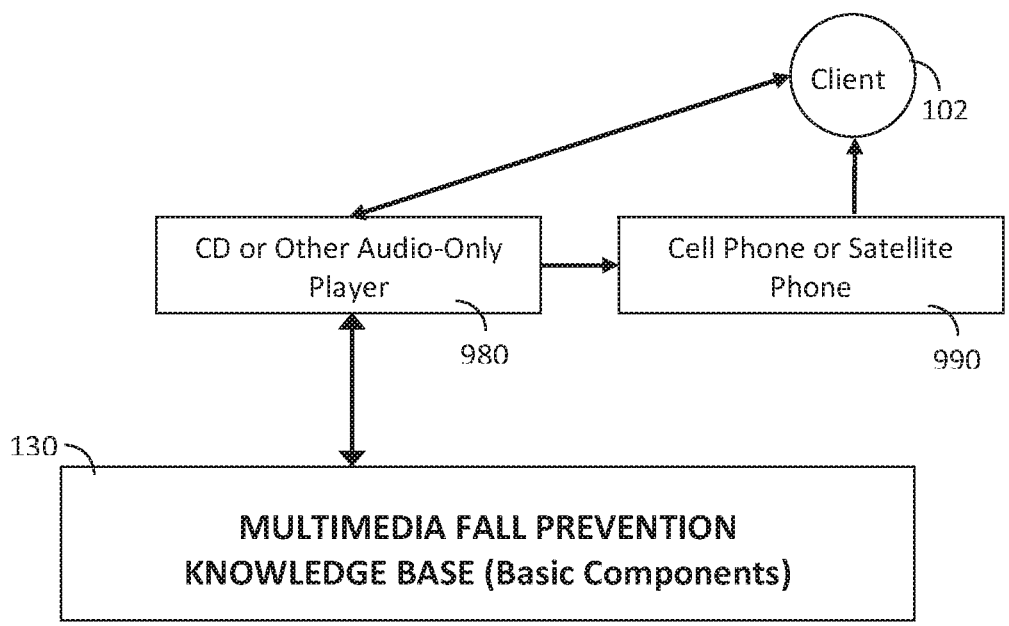
FIG. 13 is a schematic diagram of a further alternate embodiment of an MFP system for use by a client over a mobile communication network or other medium where there is no means of displaying the video components of the system.

FIG. 13 is a schematic diagram of a further alternate embodiment of an MFP system for use by a client over a mobile communication network or other medium where there is no means of displaying the video components of the system. While the video component 312 of the multimedia content 300 contributes significantly to the immersion of the client 102 into the situation, recorded help statements 304 and audio-only vignettes 306 have been successfully used. These are readily conveyed on CD or other audio-only technology 980. Certain situations will exist where video is impractical or unnecessary. Using 21st century technology, clients 102 can gain access to an MFP system through almost any mobile access medium. An incredible number of mobile technologies 990 such as cell phones, MP3 players or even old-fashioned land-line telephone service can provide audio-only access to an MFP system to address the needs of older adults who do not have access to the latest technology. This embodiment is also useful to meet the needs of the visually impaired.

A number of alternate embodiments of the invention have been described. Nevertheless, it will be understood that various modifications may be made without departing from the spirit and scope of the invention. Accordingly, other variations are within the scope of the present invention.

The invention that I claim is:

1. A method of increasing an individual's awareness of fall threats and encouraging new falls prevention behaviors to reduce the individual's risk of falling, by providing fall prevention training to a client, using a computerized multimedia system acting in concert as a machine, comprising:
- a) storing ten or more specially created multimedia vignettes in a digitized knowledge base, wherein each vignette presents situations with specific audio and video content containing at least two different fall threats, wherein each fall threat has been identified and graded for difficulty and obviousness and storing the knowledge base on a memory device that, can be accessed by said multimedia machine;

wherein the vignettes are created to offer the client experiences that permit them to discover their own unique concerns and stimulate them to formulate fall prevention strategies that meet their individual needs;
- b) querying a client, by means of a user interface and an interview module of said knowledge base, to obtain information about personally relevant data elements, and storing, by means of said multimedia machine, at least five of said elements as a client profile in an administrative module;

wherein said administrative module is accessible by said multimedia machine;
- c) creating a training set customized for the client, using a training module executable on said multimedia machine, and employing said client profile stored in said administrative module to select vignettes having client-relevant fall threats; pairing selected vignettes such that each pair presents two or more relevant fall threats in common; accessing said difficulty and obviousness grades in order to organize said pairs considering said difficulty and obviousness grades to create said customized training set containing five pairs of vignettes ordered by difficulty;

wherein said training module is a component of the multimedia software that is park of said knowledge base;
- d) displaying a first vignette of the first pair in the customized training set created in step c) on a physical display to transform digital media to image and/or sound, presenting to the client said first vignette, then querying said client by means of said user interface about content presented in said first vignette, and receiving digital confirmation that presentation of said first vignette is complete then, either
  - i) repeating said first vignette, querying the client again about what happened in that vignette, and continuing the training set, or
  - ii) eliciting from the client a description of the fall threats in said first vignette, and continuing the training set, or
  - iii) terminating the training set;
- e) displaying a second vignette of the pair in step d) to the client on said physical display, then querying said client about content, presented in said second vignette by means of said user interface, and receiving digital confirmation that presentation of said second vignette is complete;
- f) eliciting from the client, by means of said user interface, identification of specific fall threats as determined by said client profile, wherein said fall threats are shared by the pair of vignettes presented in steps d) and e); then either
- g) repeating steps d), e) and f) until all pairs of vignettes in the customized training set have been presented to the client, or
- h) if and when no more than one specific fall threat shared by two vignettes of a pair could be identified by the client, then the client is deemed to need additional help, and then using said training module to select specific pre-recorded help elements relating to specific fall threats which are shared by said pair of vignettes that the client failed to identify in step f, wherein said help elements are specified by said training module based on the fall threats determined to be relevant to said client using said client profile and selected from the group consisting of video, audio, and multimedia files, and presenting said help elements to the client on said physical display to transform digital media to image and/or sound; then
- i) eliciting from said client by means of said user interface, a description of specific fall threats shared by the two vignettes of a pair in step h), and repeating steps d) through h) until all pairs of vignettes in said customized training set have been presented to the client.

2. The method of claim 1, wherein information obtained in step b) reflects the client's fall history or current functional state, and said information is added to said client profile used to create said customized training set in step c) by said training module, thereby further individualizing said customized training set.

3. The method of claim 1, wherein the client has a pre-determined preference about fall prevention training or fall threat awareness obtained in step b), and said information is added to said client profile used to create said customized training set in step c) by said training module, thereby further individualizing said customized training set.

4. The method of claim 1, wherein said client display does not have full multimedia capabilities and said customized training set created in step c) by said training module consists of audio-only or text-only vignettes for fall prevention training.

5. The method of claim 1, wherein more than one client interacts with said computerized multimedia system acting in concert as a machine.

6. The method of claim 1, wherein said client interacts with a user of said computerized multimedia system acting in concert as a machine.

7. The method of claim 1, Wherein more than one client interacts with a user of said computerized multimedia system acting in concert as a machine.

8. A method of evaluating an individual's awareness of fall threats and identifying fall prevention behaviors to assess said individual's risk of falling or determine the need for fall prevention training, using a computerized multimedia system acting in concert as a machine, comprising:
- a) storing ten or more specially created multimedia clips in a digitized knowledge base, wherein each clip presents situations with specific audio and video content containing at least two different fall threats, wherein each fall threat has been identified and graded for difficulty and obviousness and storing the knowledge base on a memory device that can be accessed by said multimedia machine;

wherein said clips are created to offer the client experiences that permit them to recognize their own unique concerns and facilitate assessment of said client's fall risk or determination of their individual fall prevention training needs;
- b) querying a client, by means of a user interface and an evaluation module of said knowledge base, to obtain information about personally relevant data elements, and storing, by means of said multimedia machine, at least five of said elements as a client profile in an administrative module;

wherein said administrative module is accessible by said multimedia machine;

c) creating an evaluation set customized for the client, using said evaluation module executable on said multimedia machine, and employing said client profile stored in said administrative module to select clips having client-relevant fall threats to create said customized evaluation set containing ten clips;

wherein said evaluation module is a component of the multimedia software that is part of said knowledge base;

d) displaying in random order a clip of the customized evaluation set created in step c) on a physical display to transform digital media to image and/or sound, presenting to the client said clip, then querying said client by means of said user interface about content presented in said clip, and receiving digital confirmation that presentation of said clip is complete then either;
  i) continuing said evaluation set, or
  ii) repeating said clip, querying the client again about what happened in that clip, and continuing the evaluation, or
  iii) recording said client's response to said clip as having had 'No Response', and continuing said evaluation set with the next clip, or
  iv) terminating the evaluation set;

e) eliciting from the client, by means of said user interface, identification of specific fall threats recognized in said clip, wherein said fall threats are determined by said knowledge base;

then either;
  i) recording said client's response(s), by means of said user interface and continuing the evaluation set, or
  ii) repeating said clip, eliciting from said client, by means of said user interface, a description of the fall threats in said clip, recording said responses, and continuing the evaluation set, or
  iii) recording said client's response to said clip as having had 'No Response', and continuing said evaluation set with the next clip, or
  iv) terminating the evaluation set;

repeating steps d) and e) until all clips in the customized evaluation set have been presented to the client;

g) evaluating the client's awareness of fall threats and identifying fall prevention behaviors.

9. The method of claim 8, wherein information is obtained in step b) about the client's fall history or current functional state, and said information is added to said client profile used to create said customized evaluation set in step c) by said evaluation module, thereby reflecting said client's fall history or functional state and further individualizing said customized evaluation set.

10. The method of claim 8, wherein the client has a pre-determined fall risk factor or factors, or lack of fall threat awareness, and said information is added to said client profile used to create said customized evaluation set in step c) by said evaluation module, thereby reflecting the client's fall risk factor(s) or lack of awareness and further individualizing said customized evaluation set.

11. The method of claim 8, wherein said customized evaluation set created in step c) reflects the client's fall history or current functional state, and said customized evaluation set created in step c) by said evaluation module is presented in step d) in a pre-determined order, thereby further individualizing said customized evaluation set.

12. The method of claim 8, wherein the client has a pre-determined fall risk factor or factors or lack of fall threat awareness, and said customized evaluation set created in step c) by said evaluation module is presented in step d) in a pre-determined order, thereby further individualizing said customized evaluation set.

13. The method of claim 8, wherein the evaluation set created in step c) by said evaluation module is to be used as a Pre-Post evaluation in step d);
  wherein only the first five clips of said evaluation set are presented in random order in step d) to establish a baseline or pre-test evaluation, and the second five clips are presented at a later time in random order in step d) as a post-test evaluation for the assessment of change over time, or the result of an intervention or disease process.

14. The method of claim 8, wherein said customized evaluation set created in step c) reflects the client's fall history or current functional state, and said evaluation module is to be used as a Pre-Post evaluation in step d);
  wherein only the first five clips of said evaluation set are presented in a pre-specified order in step d) to establish a baseline or pre-test evaluation, and the second five clips are presented at a later time in a pre-specified order in step d) as a post-test evaluation for the assessment of change over time, or the result of an intervention or disease process.

15. The method of claim 8, wherein the client has a pre-determined fall risk factor or factors or lack of fall threat awareness, and said customized evaluation set created by said evaluation module in step c) is to be used as a Pre-Post evaluation in step d);
  wherein only the first five clips of said evaluation set are presented in a pre-specified order in step d) to establish a baseline or pre-test evaluation and the second five clips are presented at a later time in a pre-specified order in step d) as a post-test evaluation for the assessment of change over time, or the result of an intervention or disease process.

16. The method of claim 8, wherein said client display does not have full multimedia capabilities and said customized evaluation set created in step c) by said evaluation module consists of audio-only or text-only clips for evaluating the client's awareness of fall threats and identifying fall prevention behaviors.

17. The method of claim 8, wherein more than one client interacts with said computerized multimedia system acting in concert as a machine.

18. The method of claim 8, wherein said client interacts with a user of said computerized multimedia system acting in concert as a machine.

19. The method of claim 8, wherein more than one client interacts with a user of said computerized multimedia system acting in concert as a machine.

20. An interactive multimedia evaluation system implementing a method of evaluating an individual's awareness of fall threats and identifying fall prevention behaviors to assess said individual's risk of falling or determine the need for fall prevention training, using a computerized multimedia system acting in concert as a machine, comprising:
  a) storing ten or more specially created multimedia clips in a digitized knowledge base, wherein each clip presents situations with specific audio and video content containing at least two different fall threats, wherein each fall threat has been identified and graded tor difficulty and obviousness and storing the knowledge base on a memory device that can be accessed by said multimedia machine;

wherein said clips are created to offer the client experiences that permit them to recognize their own unique concerns and facilitate assessment of said client's fall risk or determination of their individual fall prevention training needs;

b) querying a client, by means of a user interface and an evaluation module of said knowledge base, to obtain information about personally relevant data elements, and storing, by means of said multimedia machine, at least five of said elements as a client profile in an administrative module;

wherein said administrative module is accessible by said multimedia machine;

c) creating an evaluation set customized for the client, using said evaluation module executable on said multimedia machine, and employing said client profile stored in said administrative module to select clips having client-relevant fall threats to create said customized evaluation set containing ten clips;

wherein said evaluation module is a component of the multimedia software that is part of said knowledge base;

d) displaying in random order a clip of the customized evaluation set created in step c) on a physical display to transform digital media to image and/or sound, presenting to the client said clip, then querying said client by means of said user interface about content presented in said clip, and receiving digital confirmation that presentation of said clip is complete then either;

i) continuing said evaluation set, or
    ii) repeating said clip, querying the client again about what happened in that clip, and continuing the evaluation, or
    iii) recording said client's response to said clip as having had 'No Response', and continuing said evaluation set with the next clip, or
    iv) terminating the evaluation set;

e) eliciting from the client, by means of said user interface, identification of specific fall threats recognized in said clip, Wherein said fall threats are determined by said knowledge base;

then either;
    i) recording said client's response(s), by means of said user interface, and continuing the evaluation set, or
    ii) repeating said clip, eliciting from said client, by means of said user interface, a description of the fall threats in said clip, recording said response, and continuing the evaluation set, or
    iii) recording said client's response to said clip as having had 'No Response' and continuing said evaluation set with the next clip, or
    iv) terminating the evaluation set;

f) repeating steps d) and e) until all clips in the customized evaluation set have been presented to the client;

g) evaluating the client's awareness of fall threats and identifying fall prevention behaviors.

\* \* \* \* \*